United States Patent [19]
van der Lely et al.

[11] 3,943,999
[45] Mar. 16, 1976

[54] TINES
[76] Inventors: Ary van der Lely, 10, Weverskade, Maasland; Cornelis Johannes Gerardus Bom, 36, Esdoornlaan, Rozenburg, both of Netherlands
[22] Filed: Mar. 13, 1974
[21] Appl. No.: 450,671

[30] Foreign Application Priority Data
Mar. 19, 1973 Netherlands............... 7303763

[52] U.S. Cl. ............... 172/59; 172/713; 172/747; 148/39
[51] Int. Cl.² ............... A01B 33/00; A01B 23/02
[58] Field of Search ....... 172/49, 59, 111, 708, 713, 172/719, 747; 148/39, 148

[56] References Cited
UNITED STATES PATENTS

| | | |
|---|---|---|
| 1,552,867 | 9/1925 | Mitchell........................ 148/148 X |
| 1,603,199 | 10/1926 | Erickson........................ 148/148 X |
| 2,519,627 | 8/1950 | Bonte............................... 148/39 X |
| 3,144,365 | 8/1964 | Ditson............................. 148/39 X |
| 3,240,639 | 3/1966 | Lihl.................................. 148/39 X |
| 3,809,166 | 5/1974 | Lely et al........................ 172/59 X |

*Primary Examiner*—Stephen C. Pellegrino
*Attorney, Agent, or Firm*—Mason, Mason & Albright

[57] ABSTRACT

A steel soil cultivating tine has a lower soil working portion and an upper fastening portion. The tine has zones of differing hardness along its length, the hardest zone including the lowermost end of the tine. The tine can take different shapes and configurations, but in general the soil working portion has sides, at least several of which taper towards the lowermost end. The fastening portion can be threaded for reception in a threaded holder. Near the juncture between the fastening and soil working portions a zone of reduced hardness lends flexibility to the tine.

18 Claims, 17 Drawing Figures

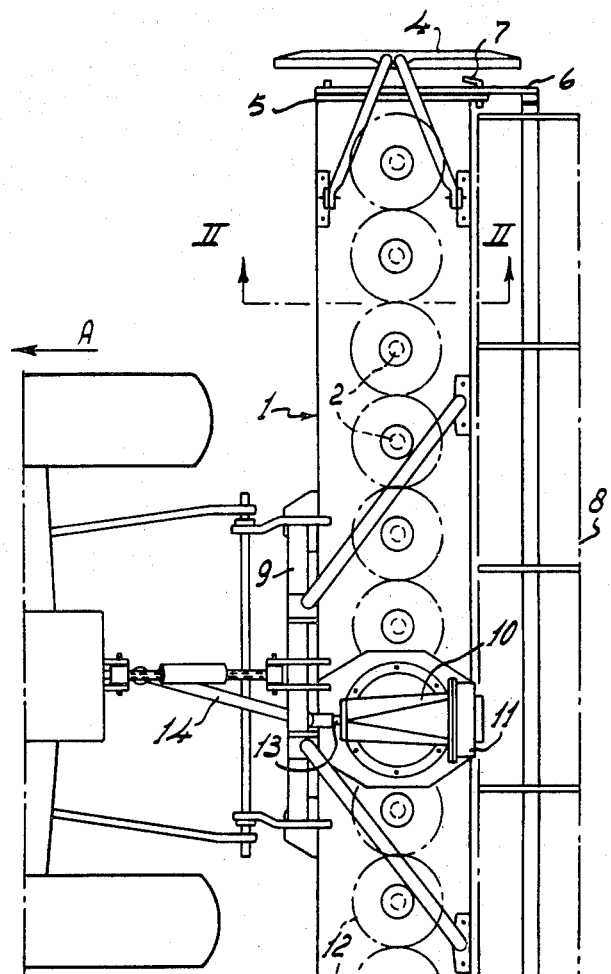
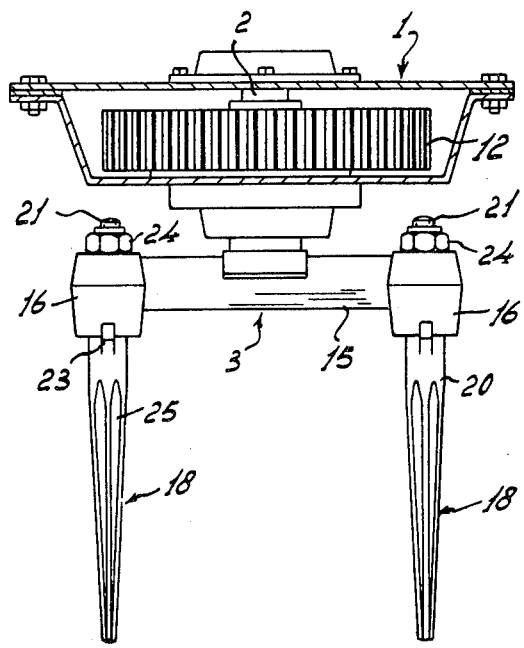

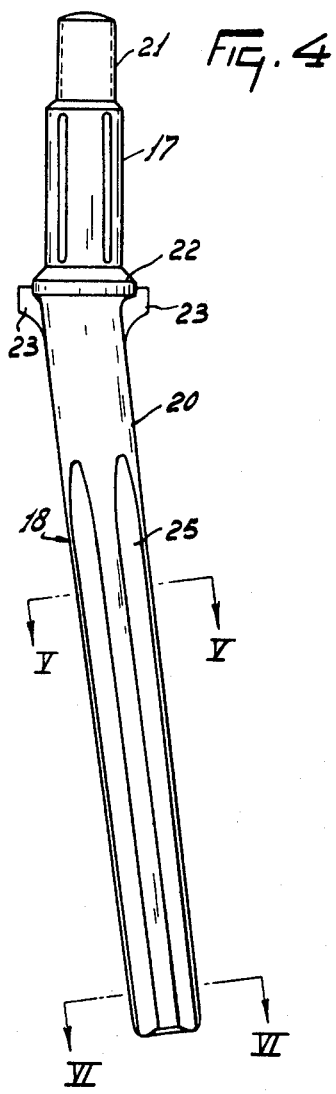
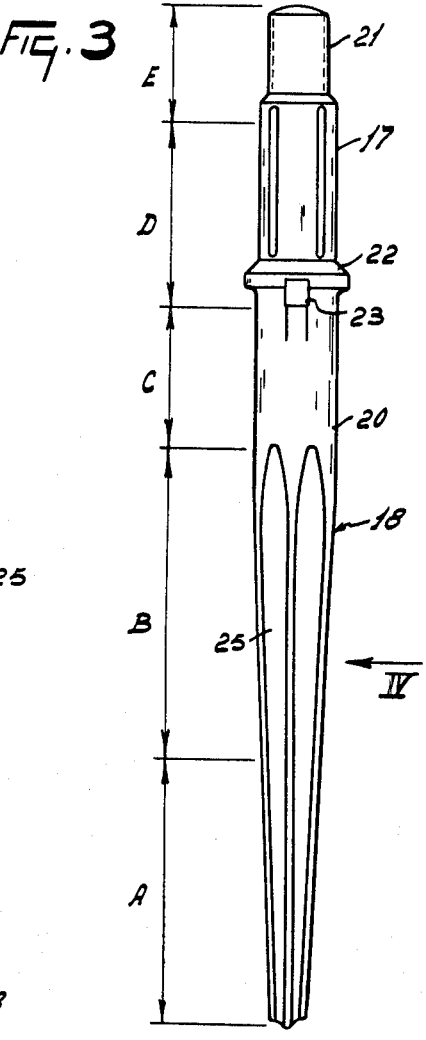
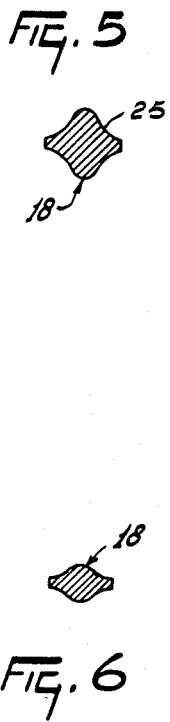
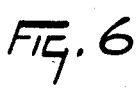

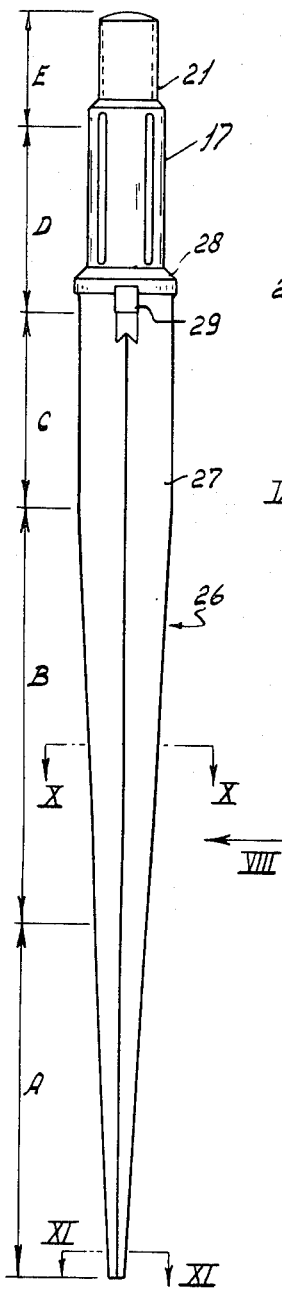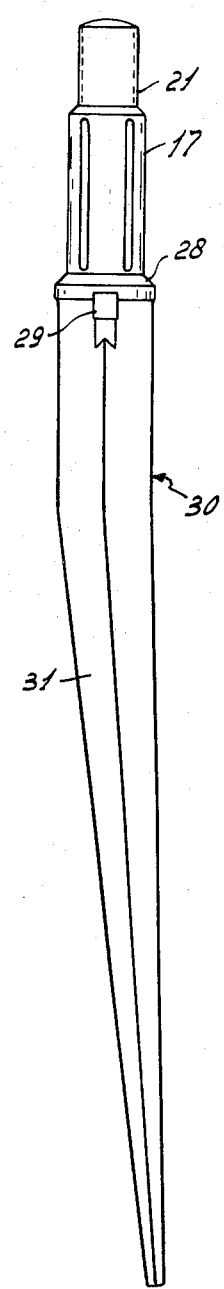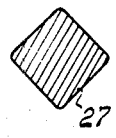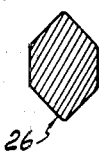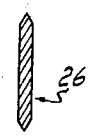
FIG. 7   FIG. 8   FIG. 12

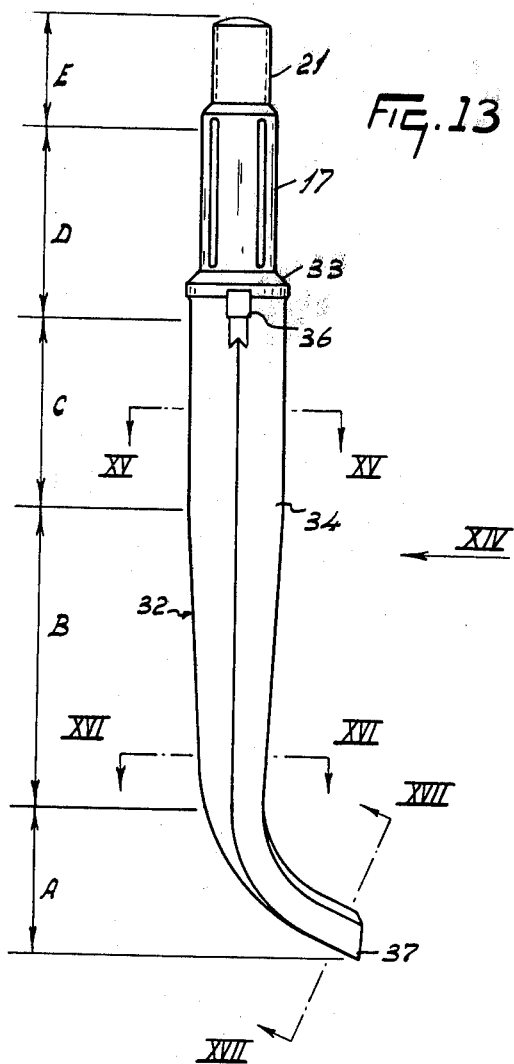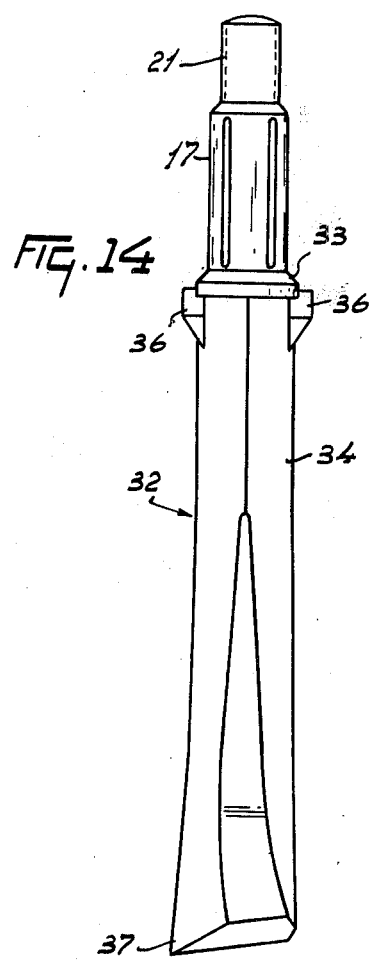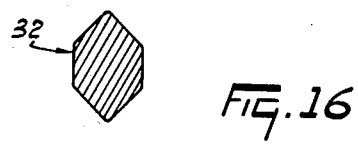

TINES

According to the invention, there is provided a tine for use in soil cultivation, which tine comprises interconnected fastening and active or soil working portions, wherein the material or materials from which the tine is formed exhibit(s) different hardnesses along the length of the tine commencing from one end thereof.

For a better understanding of the invention, and to show how the same may be carried into effect, reference will now be made, by way of example, to the accompanying drawings, in which:

FIG. 1 is a plan view of a soil cultivating implement or rotary harrow that is equipped with tines in accordance with the invention, said implement or harrow being mounted at the rear of an agricultural tractor, FIG. 2 is a section, to an enlarged scale, taken on the line II—II of FIG. 1, FIG. 3 is an elevation, to a further enlarged scale, illustrating a tine in accordance with the invention, FIG. 4 is an elevation as seen in the direction indicated by an arrow IV in FIG. 3, FIG. 5 is a section taken on the line V—V of FIG. 4, FIG. 6 is a section taken on the line VI—VI in FIG. 4, FIG. 7 is an elevation, to an enlarged scale as compared with FIGS. 1 and 2, of an alternative form of tine in accordance with the invention, FIG. 8 is an elevation as seen in the direction indicated by an arrow VIII in FIG. 7, FIG. 9 is a section taken on the line IX—IX in FIG. 8, FIG. 10 is a section taken on the line X—X in FIG. 7, FIG. 11 is a section taken on the line XI—XI in FIG. 7, FIG. 12 is an elevation, to the same scale as FIGS. 7 to 11, of a further alternative embodiment of a tine in accordance with the invention, FIG. 13 is an elevation, to the same scale as FIGS. 7 to 12, of a still further alternative embodiment of a tine in accordance with the invention, FIG. 14 is an elevation as seen in the direction indicated by an arrow XIV in FIG. 13, FIG. 15 is a section taken on the line XV—XV in FIG. 13, FIG. 16 is a section taken on the line XVI—XVI in FIG. 13, and FIG. 17 is a section taken on the line XVII—XVII in FIG. 13, Referring to the accompanying drawings, FIG. 1 thereof illustrates a soil cultivating implement in the form of a rotary harrow that is equipped with soil working tines in accordance with the invention, a more detailed description of which tines will be given below. The rotary harrow has a frame part 1 in the form of a hollow beam that extends substantially horizontally perpendicular, or at least transverse, to the intended direction of operative travel of the harrow which is indicated by an arrow A in FIG. 1. A plurality, such as twelve, of substantially vertical or at least upwardly extending shafts 2 are rotatably mounted in the frame part 1 by means of bearings carried at the top and bottom of that frame part, said shafts 2 being arranged in a single row at regularly spaced apart intervals that may conveniently have a magnitude of substantially 25 centimeters. The lowermost end of each shaft 2 projects from beneath the bottom of the frame part 1 and has a corresponding soil working member or rotor 3 rigidly secured to it. Shield plates 4 are arranged immediately beyond the opposite lateral ends of the single row of soil working members or rotors 3, said shield plates 4 having their lowermost edges constructed for sliding motion over the ground surface and said plates being pivotally mounted so as to be turnable upwardly and downwardly around corresponding axes that extend substantially horizontally parallel to the direction A. The opposite lateral sides or ends of the hollow frame part 1 are closed by corresponding substantially vertically disposed sector plates 5 alongside which arms 6 are upwardly and downwardly turnable about a substantially horizontal axis afforded by aligned pivots located near the top of the frame part 1 and towards the front thereof with respect to the direction A. The arms 6 can be retained in chosen angular settings around the pivots which have just been mentioned by entering locking pins 7 through holes in the arms 6 and through chosen holes in curved rows thereof that are formed in rearmost edge regions of the sector plates 5. A rotary supporting member and combined soil compressing member in the form of a roller 8 is rotatably mounted between substantially horizontal bearings carried at the lowermost and rearmost ends of the arms 6 with respect to the direction A and it will be apparent that the chosen settings of the arms 6 relative to the sector plates 5 determine the level of the axis of rotation of the roller 8 relative to the remainder of the rotary harrow and thus are a major factor in determining the depth of penetration of the tines that will hereinafter be described into the soil during the operation of the harrow.

The front of the frame part 1 with respect to the direction A is provided with a generally triangular coupling member or trestle 9 that is constructed and arranged for connection to the three-point lifting device or hitch of an agricultural tractor or other operating vehicle in the manner that is illustrated in outline in FIG. 1. One of the center pair of shafts 2 of the single row thereof has an upward extension into a gear box 10 that is rigidly mounted on top of the frame part 1. Transmission members within the gear box 10 and within a change-speed gear 11 mounted at the rear of said gear box place the shaft extension which has just been mentioned in driven connection with a rotary input shaft 13 of the gear box 10 that projects forwardly from the front of that box in substantially the direction A. The rotary input shaft 13 is splined or otherwise keyed to enable it to be placed in driven connection with the power take-off shaft of the operating tractor or other vehicle through the intermediary of a telescopic transmission shaft 14 of a construction that is known per se having universal joints at its opposite ends. The change-speed gear 11 comprises interchangeable and/or exchangeable pinions from which combinations can be selected to give different transmission ratios between rotary shafts contained within the gear box 10. Thus, different speeds of rotation of the shafts 2 can be attained in response to a single speed of rotation applied to the input shaft 13 by selecting corresponding transmission ratios. Each shaft 2 is provided, inside the hollow frame part 1, with a corresponding straight- or spur-toothed pinion 12, said pinions 12 being in successively meshing relationship with one another so that, upon applying rotary drive to the input shaft 13, each shaft 2 and the corresponding soil working member or rotor 3 will rotate about the axis of that shaft 2 in a direction opposite to that of its neighbour or to that of each of its neighbours.

As can be seen best in FIG. 2 of the drawings, each of the soil working members or rotors 3 comprises a corresponding tine support 15 that is substantially horizontally disposed and a central region of which is rigidly secured to the lowermost end of the shaft 2 by which it is carried. The opposite ends of each tine support 15 carry two substantially cylindrical sleeve-like tine holders 16 whose longitudinal axes or center lines are parallel or substantially parallel to the axis of rotation of the corresponding shaft 2 and are thus normally substantially vertically disposed. Each holder 16 receives the fastening portion 17 of a corresponding soil working tine 18, said tines 18 being constructed in accordance with the present invention. In addition to its upper fastening portion 17, each tine comprises a lower active or soil working portion 20, said portions 17 and 20 being integrally interconnected by an angular bend in such a way that the longitudinal axes of the two straight portions are inclined to one another at an angle of substantially 8°. A shoulder 22 is provided at substantially the level of the integral junction between the portions 17 and 20 and has an upwardly facing frusto-conical surface arranged to co-operate with a matchingly shaped surface internally of the lower end of the co-operating sleeve-like holder 16. Two diametrically opposed projections 23 are formed on the active or soil working portion 20 at the level of the shoulder 22 and immediately beneath that level, said projections 23 being arranged to co-operate with similarly positioned notches or recesses in the wall of each holder 16 at the lowermost end thereof. When the projections 23 are lodged in the co-operating notches or recesses, the corresponding tine 18 cannot turn about the longitudinal axis of its fastening portion 17 in the holder 16 in which that fastening portion is lodged.

Each fastening portion 17 has a cylindrical part immediately above the corresponding shoulder 22 which cylindrical part is constructed and arranged to fit intimately with an absolute minimum of clearance in the interior of the corresponding holder 16 to produce optimum rigidity of the assembly. Above the cylindrical part, there is a screwthreaded part 21 of marginally smaller diameter which part is arranged to receive a co-operating fastening nut 24 (FIG. 2) which, when tightened, maintains the whole fastening portion 17 fixedly in its holder 16. The lower end of each nut 24 is of frusto-conical configuration and is arranged to co-operate self-centringly with a matching abutment surface at the upper end of the associated holder 16. Each nut 24 preferably includes an insert arranged to co-operate frictionally with the screwthreaded part 21 so as to tend to prevent vibration during the use of the rotary harrow from working the nut loose.

The active or soil working portion 20 of each tine 18 comprises an upper part of circular cylindrical configuration which has a length equal to substantially one-quarter of that of the whole portion 20. The part which has just been described merges integrally into a downwardly tapering part that is both tapered and flattened towards its lowermost free end or tip. The tapering part has a polygonal cross-section, but, as illustrated, the cross-section is preferably a basically rectangular one. It can be seen from FIG. 5 of the drawings that, near the top of the tapering part of the active or soil working portion 20 of the tine, two relatively perpendicular diagonals between opposite extremities of said part as seen in cross-section at that level are of substantially the same magnitude with any difference in length between them being only marginal. However, at a level close to the free end or tip of the same tapering part (see FIG. 6), said part is flattened to an extent such that, while one of the diagonals as seen in FIG. 6 is only marginally reduced in length, if at all, the relatively perpendicular diagonal is greatly shortened and has a length which is only approximately half that of the other diagonal. It will be evident from a study of FIGS. 3, 5 and 6 of the drawings that this flattening is progressive towards the lowermost free end or tip of the tapered part of the active or soil working portion 20 and it will be noted that the extremities (in cross-section) between which the distance is substantially the same at the level of FIG. 5 and the level of FIG. 6 are substantially flat extremities while the two extremities which are much closer to one another at the level of FIG. 6 than they are at the level of FIG. 5 are of rounded configuration. The surfaces that, in cross-section, extend between said extremities are formed with inverse or hollow grooves 25, said grooves 25 extending throughout substantially the whole of the length of the tapering part of the active or soil working portion 20 and throughout substantially the lower three-quarters of the length of that portion 20. The grooves 25 are of a width which is such that they extend throughout substantially the whole of the distance, in cross-section, between the corresponding extremities.

The tine 18 that has been described above is formed, in accordance with the invention, from at least one material afforded by carboron-manganese forgeble steel, hardened in a special way, whose hardness varies along the length of the tine from one end thereof. The tine 18 is thus particularly suitable for soil working applications and is very effective in a rotary harrow having soil working members or rotors 3 that revolve at high speed during operation thus passing the tines through the soil very rapidly. The tine 18 comprises five zones A, B, C, D and E (FIG. 3) of differing hardnesses. The lowermost zone A is of the greatest hardness and has a length equal to substantially one-third of the length of the soil working or active portion 20. The zone A has a hardness as measured on the Rockwell Scale (hereinafter referred to as "Rockwell hardness") of between 175 to 200 kg per square millimeter. The upper end of the zone A merges into the zone B which zone is of slightly greater length than the zone A and which extends from the junction between the two zones A and B to a level at the upper end of the polygonal or tapering part of the soil working or active portion 20. The zone B may have a Rockwell hardness of 140 to 200 kg per square millimetre. The upper end of the zone B merges, in turn, into a zone C that is of still lower hardness, said zone C having a length substantially coinciding with that of the upper circular cylindrical part of the soil working or active portion 20. The material in the zone C is of greater flexibility than that in the underlying zones B and A so that the region of the soil working or active portion 20 of the tine 18 that is close to the junction of that portion with the fastening portion 17 is somewhat more elastic with the result that the whole assembly will be able to absorb the heavy forces that act in and around the zone C during operation of the rotary harrow with a considerably reduced risk of breakage. The Rockwell hardness of the material in the zone C may be 130 to 150 kg per square millimeter.

The upper end of the zone C merges into the zone D which zone extends from a level just beneath that of the collar 22 to a level just beneath the junction between the cylindrical part of the fastening portion 17 and the screwthreaded part 21 thereof, said zone D thus including the shoulder 22 and most of said cylindrical part. The zone D has a lower hardness than the zone C but is of slightly greater toughness, the fastening function of said zone thus being served with optimum efficiency by the material thereof. The material in the zone D has a Rockwell hardness of from 75 to 150 kg per square millimetre. The final uppermost zone E of the tine 18 encompasses the screwthreaded part 21 of the fastening portion 17 and a short upper end region of the cylindrical part of that portion 17. The material in the zone E has the lowest hardness of all five of the zones, the tensile stress or Rockwell hardness thereof being 75 to 100 kg per square millimetre.

FIGS. 7 to 11 of the drawings illustrate an alternative tine 26 in accordance with the invention whose fastening portion 17 is identical to that which has already been described. The tine 26 also comprises five zones A to E whose extents and Rockwell hardnesses correspond to the similarly designated zones of the tine of FIGS. 2 to 6 of the drawings. The tine 26 has an active or soil working portion 27 whose longitudinal axis is substantially coincident with that of the fastening portion 17, a shoulder 28 exhibiting an upwardly directed frusto-conical abutment surface being formed at the integral junction between the two portions 17 and 27. Two diametrically opposed projections 29 are formed on the active or soil working portion 27 at, and immediately beneath, the level of the shoulder 28, said projections 29 being constructed and arranged for co-operation with notches or recesses in the lower ends of the sleeve-like holders 16 as has already been described with reference to the projections 23. However, in this case, it will be seen from FIGS. 7, 8 and 9 of the drawings that an upper part of the active or soil working portion 27 that extends throughout substantially one-quarter of the length of that portion is of square cross-section in contrast with the circular cross-section in the preceding embodiment. The projections 29 are located in register with two opposite corners of the square cross-section and it will be noted that said upper part substantially coincides with the hardness zone C. A lower part of the active or soil working portion 27 which substantially coincides with the hardness zones A and B and which extends throughout substantially three-quarters of the length of said portion 27 is formed, in cross-section (FIGS. 10 and 11) with two additional flats that are diametrically opposed to one another at opposite sides of the portion 27 and that progressively increase in width from top to bottom so that, as seen in one direction (FIG. 7) the tine tapers and is progressively flattened towards its tip whereas, as seen in a relatively perpendicular direction (FIG. 8) the width of the tine increases slightly but progressively towards its lowermost end. At a level approximately midway along the length of the hardness zone B (FIG. 10), the active or soil working portion 27 has a cross-section in the shape of a six-sided regular polygon whereas, near the lowermost free end or tip of said portion 27 in the hardness zone A (FIG. 11), the cross-section is nearly oblong exhibiting two short and pointed sides and two much longer parallel sides whose lengths are substantially ten times the perpendicular distance between them.

FIG. 12 illustrates a tine 30 in accordance with the invention which is similar in many respects to the tine 26 of FIGS. 7 to 11 except that, in the embodiment of FIG. 12, the tine 30 is not straight throughout its length. An angular bend is formed in an active or soil working portion 31 of the tine 30 towards the lower end of the hardness zone C thereof so that the lower flattened part of said portion 31 which comprises the hardness zones A and B has its longitudinal axis inclined to that of the fastening portion 17 of the tine 30 and to the square cross-section upper part of said active or soil working portion 31. The angle between the two longitudinal axes at the integral junction is substantially 4°. As can be seen by comparing FIG. 12 with FIGS. 7 and 8 of the drawings, it is the two diametrically opposed sides of the portion 31 that are formed with the additional two flats that are bent over with respect to the longitudinal axis of the fastening portion 17 and the coincident longitudinal axis of the upper square cross-section part of the active or soil working portion 31.

FIGS. 13 to 17 of the drawings illustrate a tine 32 in accordance with the invention which tine again has five hardness zones A to E whose extents and hardnesses correspond to those that have already been described with reference to the preceding embodiments. The tine 32 has a fastening portion 17 of identical construction and function to the portion 17 that has been described above, said portion making an integral junction with a lower active or soil working portion 34 and there being a shoulder 33 formed at the level of said junction which shoulder is similar in configuration and function to the previously described shoulders 22 and 28. The tine 32 is also provided with two diametrically opposed projections 36 which are provided for the same purpose as, and that are located at similar points to, the previously described projections 23 and 29. The upper part of the active or soil working portion 34 of the tine 32 that substantially coincides with the hardness zone C is of square cross-section (see FIG. 15) whereas a lower part of said portion 34 that substantially coincides with the hardness zones A and B is formed with two diametrically opposed flats that progressively increase in width towards the lowermost free end or tip of the tine 32 in much the same manner as has already been described with reference to FIGS. 7 to 11 of the drawings. However, in this case, a lowermost end region of the active or soil working portion 34 of the tine 32 that includes the zone A of greatest hardness is bent over laterally with respect to the intended direction of rotation of the soil working member or rotor 3 of which it will form a part when it is in use through an angle of substantially 45°. The bend commences immediately beneath the level of the cross-section of FIG. 16 of the drawings at which level said cross-section has the shape of a six-sided regular polygon. The flat free end or tip of the active or soil working portion 34 is bevelled to a small extent in such a way that said end is inclined rearwardly with respect to the intended direction of rotation which has just been mentioned. The leading corner or extremity of the bent-over lower part of the polygonal cross-section tine with respect to the intended direction of rotation that has just been discussed is formed as a knife edge 37.

Each of the tines that have been described may have a length of not less than 20 and not more than 30 centimeters and it is preferred to employ a length of substantially 25 centimetres. The material of each tine has five different zones of hardness commencing from one end thereof and, in the examples which have been described, the zone of greatest hardness is at the free end or tip of the active or soil working portion of the tine with the subsequent zones therealong progressively decreasing in hardness to the zone E of lowest hardness which is located at the opposite terminal part 21 of the fastening portion 17 of the tine. The active or soil working portion of each tine exhibits an optimum resistance to wear while employing a corresponding minimum quantity of material. The zones C of the active or soil working portions of the tines are close to the fastening portions 17 thereof that are clamped in the holders 16, said zones C, which have to resist the heaviest forces of any parts of the tines during operative motion thereof through the soil, being of greater elasticity than the other zones of said active or soil working portions so that the forces mentioned above can be absorbed smoothly with a reduced likelihood of breakage. Stresses occurring in the fastening portions 17 themselves are readily absorbed because the material of the tines in said fastening portions is of still lower hardness. All of the tines that have been described above have zones of different hardness that are matched to an optimum extent to the different loads to which those zones will be subject during the operation of the tines so that extremely effective tines are produced without the use of excessive quantities of tine material.

While various features of the tines that have been described and/or that are illustrated in the accompanying drawings will be set forth in the following claims as inventive features, it is emphasised that the invention is not necessarily limited to those features and that it includes within its scope every part of each tine and of the rotary harrow that has been described and/or illustrated in the accompanying drawings both individually and in various combinations.

I claim:

1. A soil-cultivating implement comprising a plurality of rotatable soil-working members located side-by-side in a row that extends transverse to the direction of travel of the implement, said soil-working members each having at least one downwardly extending, elongated steel tine and said tine being comprised of an upper fastening portion and a lower soil-working portion having a tip, said soil-working portion comprising at least three zones of increasing Rockwell hardness towards said tip and said soil-working portion being interconnected with said fastening portion at an integral junction, said third zone of said soil-working portion being of the lowest hardness of said three zones and substantially coinciding with a part of said soil-working portion located adjacent said junction, the fastening portion of said tine comprising two zones of different hardness, the zone of greater hardness adjoining said junction and the zone of lower hardness being screw-threaded and connecting said fastening portion in a substantially horizontal holder of a soil-working member, said junction being located adjacent the lower side of said holder.

2. A tine for rotary cultivator use comprising an elongated steel tine having a lower soil-working portion that terminates in a tip and an upper fastening portion, said soilworking portion being interconnected to said fastening portion at a junction and said tine having zones of different Rockwell hardness along its length, a zone of said soil-working portion located and adjacent the interconnection between that portion and said fastening portion being of lower hardness and more flexible and elastic than the remainder of said soil-working portion, the relative hardness of said soil-working portion increasing towards its tip, said fastening portion having zones of different hardness, a shoulder at said junction being provided between a zone of greatest hardness of the fastening portion and the zone of lower hardness of said soil-working portion, at least one projection being located adjacent said junction.

3. A tine as claimed in claim 2, wherein said soil working portion has a substantial rectangular cross-section adjacent said tip.

4. A tine as claimed in claim 2, wherein a zone of said soil working portion is greatest in hardness and bent over adjacent said tip end.

5. A tine as claimed in claim 4, wherein the bentover portion of said soil working portion has a bend of about 45°.

6. A tine as claimed in claim 2, wherein there are five of said zones of different hardness which decrease in value from about 175 to 200 kg per square millimeter of said tip.

7. A tine as claimed in claim 2, wherein the zone adjacent the interconnection of said soil working and said fastening portions is substantially circular in cross-section.

8. A tine as claimed in claim 2, wherein said fastening portion comprises two zones of different hardness.

9. A tine as claimed in claim 8, wherein the zone of the fastening portion which is of greater hardness, is substantially circular in cross-section.

10. A tine as claimed in claim 8, wherein the zone of said fastening portion which is of lower hardness is screwthreaded.

11. A tine as claimed in claim 2, wherein said tine is comprised of carbon-manganese forgeable steel and said tip has a Rockwell hardness of about 175–200 kg/mm$^2$.

12. A tine for rotary cultivator use comprising an elongated steel tine having a lower soil-working portion that terminates in a tip and an upper fastening portion, said soil-working portion being interconnected to said fastening portion at a junction and said tine having zones of different Rockwell hardness along its length, the relative hardness of said soil-working portion increasing towards its tip, said soil-working portion having three zones of successively decreasing hardness commencing from a lowermost zone which includes said tip, at least one of said zones being of different length that the length of the lowermost zone, a third zone having the lowest hardness of said three zones and substantially coinciding with a part of said soil-working portion located adjacent said junction.

13. A tine as claimed in claim 12, wherein two of said three zones are substantially equal in length and a third zone is of relatively shorter length.

14. A tine as claimed in claim 2, wherein the lowermost two zones of hardness of said soil working portion substantially coincide with a tapering region of said soil working portion.

15. A tine as claimed in claim 14, wherein said tapering region is polygonal in cross-section.

16. A tine as claimed in claim 15, wherein said polygonal cross-section has two relatively perpendicular diagonals and the length of at least one of those diagonals progressively changes at different locations which successively approach the tip of said tine.

17. A tine as claimed in claim 16, wherein one of said diagonals, as seen in cross-section, is substantially half of the length of the other at a location adjacent said tip.

18. A tine as claimed in claim 2, wherein the sides of said soil working portion as seen in cross-section have grooves extending throughout substantially the entire lowermost two zones of different hardness commencing from the tip of said soil working portion.

* * * * *